(12) United States Patent
Iacenda

(10) Patent No.: US 11,691,686 B2
(45) Date of Patent: Jul. 4, 2023

(54) WINDSCREEN WITH AN ADJUSTABLE HEIGHT FOR A MOTORCYCLE

(71) Applicant: DUCATI MOTOR HOLDING S.P.A., Bologna (IT)

(72) Inventor: Luca Iacenda, Bologna (IT)

(73) Assignee: DUCATI MOTOR HOLDING S.P.A., Bologna (IT)

(*) Notice: Subject to any disclaimer, the term of this patent is extended or adjusted under 35 U.S.C. 154(b) by 84 days.

(21) Appl. No.: 17/504,650

(22) Filed: Oct. 19, 2021

(65) Prior Publication Data

US 2022/0135163 A1 May 5, 2022

(30) Foreign Application Priority Data

Oct. 30, 2020 (IT) .................... 102020000025822

(51) Int. Cl.
*B62J 17/04* (2006.01)
(52) U.S. Cl.
CPC ................... *B62J 17/04* (2013.01)
(58) Field of Classification Search
CPC ....................................................... B62J 17/04
See application file for complete search history.

(56) References Cited

U.S. PATENT DOCUMENTS

| | | | |
|---|---|---|---|
| 9,132,875 B2* | 9/2015 | Kato | B62J 17/04 |
| 9,937,972 B2* | 4/2018 | Nakano | B62J 17/04 |
| 2014/0084619 A1* | 3/2014 | Willey | B62J 17/04 |
| | | | 296/89 |
| 2021/0107584 A1* | 4/2021 | Sawada | B62J 17/04 |

FOREIGN PATENT DOCUMENTS

| | | |
|---|---|---|
| EP | 2017169 A1 | 1/2009 |
| EP | 2711274 A2 | 3/2014 |
| JP | 2016078526 A | 5/2016 |

OTHER PUBLICATIONS

Search Report and Written Opinion dated Jun. 23, 2021 for Italian patent application No. 10202000025822 filed on Oct. 30, 2020.

* cited by examiner

*Primary Examiner* — Amy R Weisberg
*Assistant Examiner* — Melissa Ann Bonifazi
(74) *Attorney, Agent, or Firm* — Vorys, Sater, Seymour and Pease LLP

(57) ABSTRACT

Windscreen with adjustable height for a motorcycle, for associating with a front part of the motorcycle vehicle, including a support portion secured on this front part, a transparent portion movable relative to the support portion, and movement apparatus allowing varying height of this transparent portion relative to the support portion. The movement apparatus includes a body guidably movable inside a seat of the support portion and integral with the transparent portion. The movable body including lateral movable coupling elements for cooperating with consecutive and adjacent seats present at different heights on sides of the support portion seat. The coupling elements controlled by a release unit and subjected to thrust action of resilient elements which can thrust these coupling elements inside the seats of the elements in the support portion, to lock the transparent portion at different heights relative to the support portion.

8 Claims, 7 Drawing Sheets

WINDSCREEN WITH AN ADJUSTABLE HEIGHT FOR A MOTORCYCLE

This claims the benefit of Italian patent application no. 102020000025822, filed Oct. 30, 2020.

The subject of the present invention is a windscreen with an adjustable height for a motorcycle, according to the preamble of the main claim.

For some time there have been known windscreens for motorcycles, which windscreens have a height which is adjustable relative to a front part of the vehicle and integral with a conventional handlebar of the motorcycle. In general, these windscreens comprise a support portion which is secured on this front part of the vehicle, and relative to which a movable transparent portion is provided. The height of this portion is moved in a controlled manner relative to the support portion under the action of movement means.

EP2711274 describes a system for adjusting the height of a windscreen of a vehicle (motorcycle or scooter) comprising a pair of elements for support of the windscreen, which elements are connected to the vehicle, and also act as guides for the adjustment of the height of the windscreen relative to the vehicle, and for locking of this windscreen at various heights relative to this vehicle.

Each support and guide element has securing points which can permit connection of said element to the vehicle. This support element comprises a guide profile provided with a series of notches along which there moves a body for positioning and locking which is integral with the windscreen. This body supports an element for locking the movement of the body for positioning and locking, having a stop portion which can cooperate with the series of notches of the guide profile of the support and guide element.

The locking element can move along a support portion of the body for positioning and locking, which supports it in opposition to a thrust element or compression spring which is interposed between this support portion and said locking element. Said movement (which takes place on the body for positioning and locking, but not along the element which supports the windscreen and is integral with the vehicle) makes it possible to detach the stop portion of said locking element from the series of notches of the support element, such as to permit sliding along the support element itself of the body for positioning and locking, with the consequent possibility of adjustment of the height of the windscreen.

The movement of the locking element relative to the support portion is activated by acting on an arm for activation of this element which penetrates into the windscreen through an activation opening thereof; on said activation arm there is placed an activation unit in the form of a pushbutton, which is thus placed on an outer surface of the windscreen, and pressing on which towards the windscreen permits the movement of the locking element, in order to permit the sliding of the body for positioning and locking along the support element.

This known solution thus makes it possible (as also described in the patent) to adjust the height of the windscreen by acting on each activation unit or pushbutton associated with each locking element of the system which is the subject of EP2711274, and only the pressure on this pushbutton permits the movement of the windscreen. This can be carried out in a manner which is not simple for the driver, in particular if he is seated on the saddle of the vehicle, and often it requires him to be positioned in front of the vehicle in order to modify the height of the windscreen.

In addition, this action needs to be carried out with two hands, since correct support of the windscreen (in order to withstand the stresses to which it is subjected by the movement of the vehicle) can take place only by using a pair of support elements, as also shown in the figures of the prior document in question. Thus, the height is adjusted in a manner which is not easy for the driver.

In addition, the support elements (which also act as a guide for the movement of the windscreen) are elements which are exposed to atmospheric agents and mud, which may impede correct sliding thereon of the respective bodies for positioning and locking which are integral with the windscreen.

The objective of the present invention is to provide a windscreen with an adjustable height which is improved in comparison with the known windscreens.

In particular, the objective of the invention is to provide a windscreen of the aforementioned type which can be moved simply and rapidly by the driver of the vehicle, using a single hand, and without having to get off the vehicle.

Another objective is to provide a windscreen, the movement and support units of which are also incorporated aesthetically in the vehicle, wherein these units are produced such as to oppose efficiently the forces in play which act on the windscreen when the vehicle is moving, which forces are derived from the "sail" effect of the windscreen.

A further objective is to provide a windscreen, wherein the units thereof which can adjust the height are efficiently protected against water, dust and mud.

A further objective of the invention is to provide windscreen of the aforementioned type which is simple to produce.

These objectives and others, which will become apparent to persons skilled in the art, are achieved by an adjustable windscreen according to the appended claims.

For better understanding of the present invention, and purely by way of non-limiting example, the following drawings are appended, in which.

Figure 1:
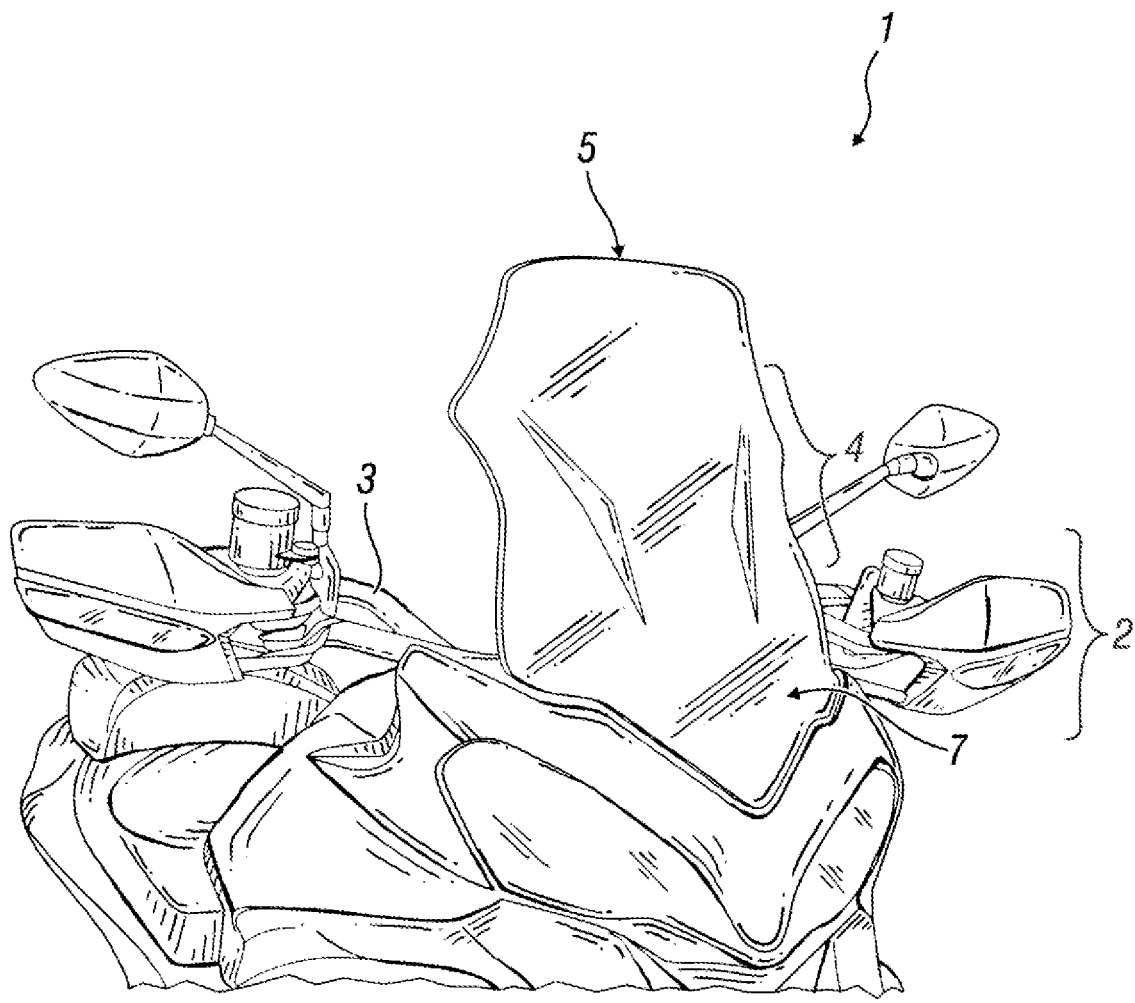
FIG. 1 shows a partial view in perspective from the front of a motorcycle provided with a windscreen according to the invention.
Figure 2:
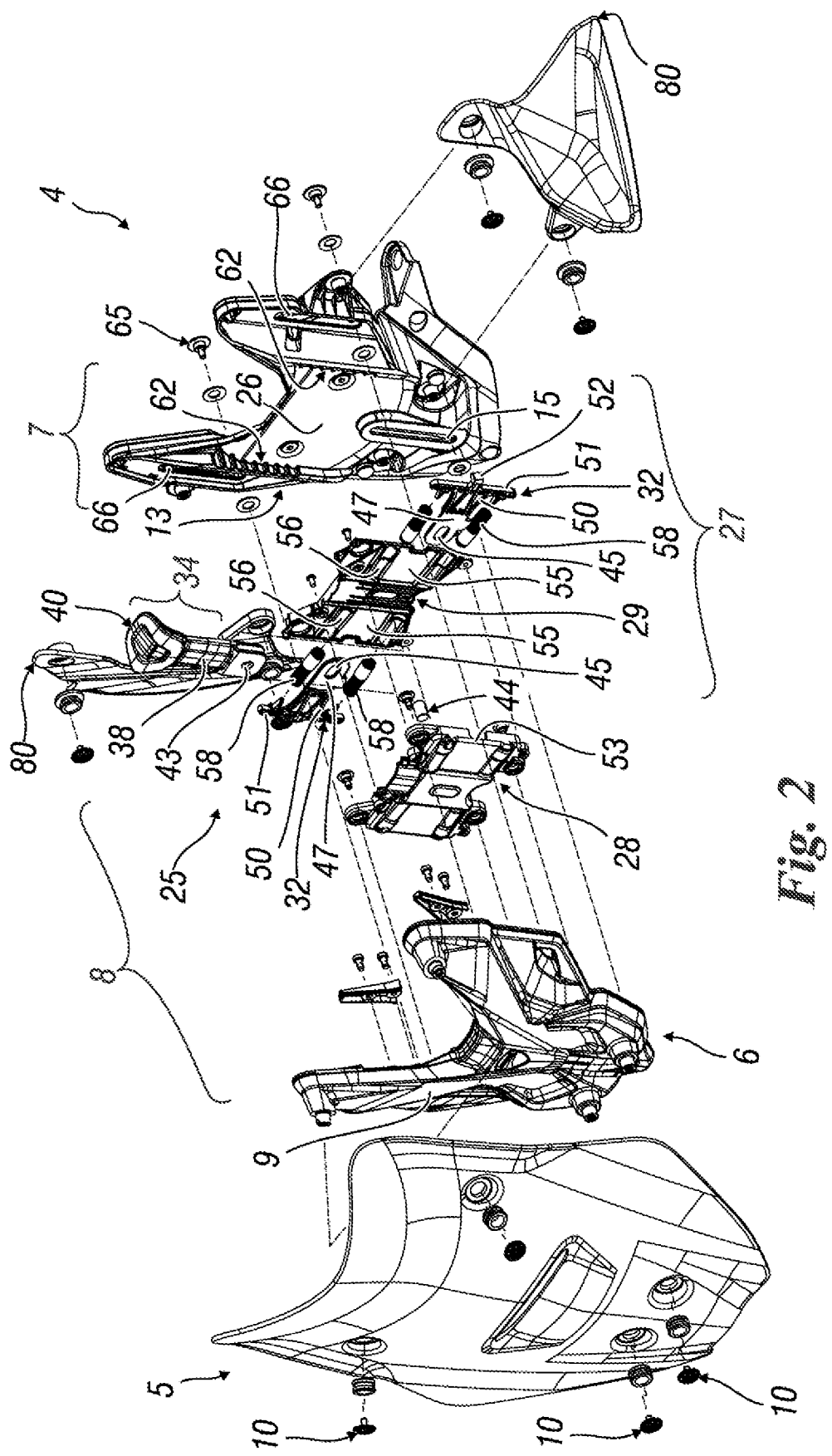
FIG. 2 shows an exploded view in perspective from the front of the adjustable windscreen in FIG. 1.
Figure 3:
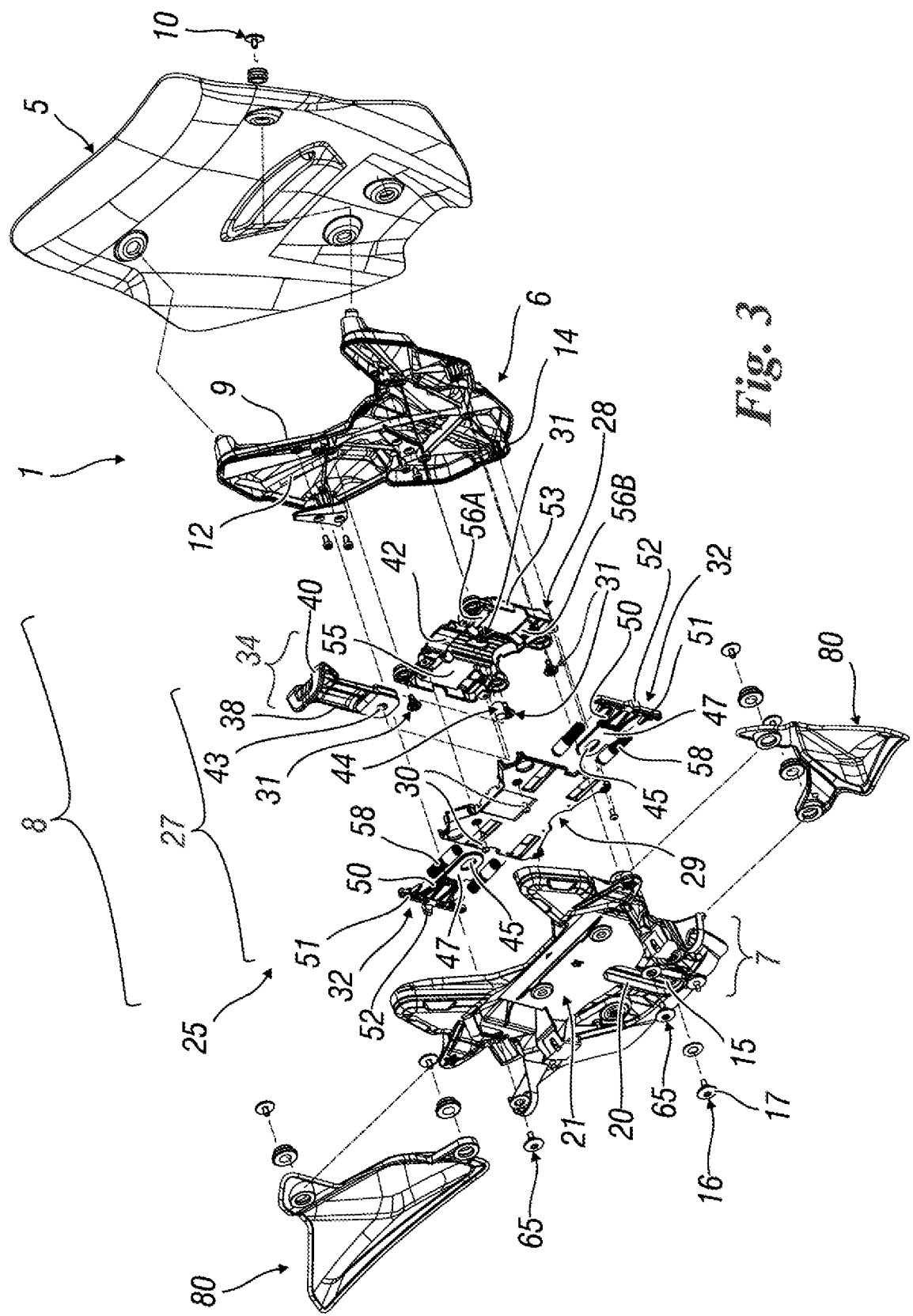
FIG. 3 shows an exploded view in perspective from the rear of the windscreen in FIG. 1.

With reference to the aforementioned figures, a motorcycle is indicated generally as 1, and comprises a front part 2 which is associated with a handlebar 3. A windscreen 4 of the type with adjustable height is integral with this front part.

The windscreen 4 comprises a transparent portion 5 integral with a connection body 6 which is movable relative to a support portion 7 (with which this body is connected in a sliding manner) secured on the front part 2 of the motorcycle. An opening or space 8 is present between the body 6 and the portion 7. The connection body 6 is movable relative to the support portion 7, such as to permit raising of the transparent portion 5 relative to this portion, and thus relative to the front part 2 of the vehicle. The height of this portion 5 can be moved relative to this front part 2, over a course of several tens of millimetres.

More particularly, the connection body 6 has a side 9 (on the outside of the space 8) on which the transparent portion 5 is secured (by means of screws or equivalent connection elements 10), and a side 12 (on the inside of the space 8), facing a face 13 of the fixed support portion 7 on the inside of the space 8.

From this side 9 there projects a hollow body 14, which can slide along a guide slot 15 provided within the portion 7 with which this body 14 is integral, by means of a screw or connection unit 16 (which unit is slidable in said slot), having a widened head 17 which is supported on, and slidable within, a recess 20 provided in a face 21 (on the outside of the space 8) of the portion 7 at the slot 15.

Between the support portion 7 and the connection body 6, in the space 8, there are present movement means which can permit the movement of the transparent portion 5, such as to permit the positioning thereof at various heights relative to the support portion 7 or the front part 2 of the motorcycle.

Figure 7:
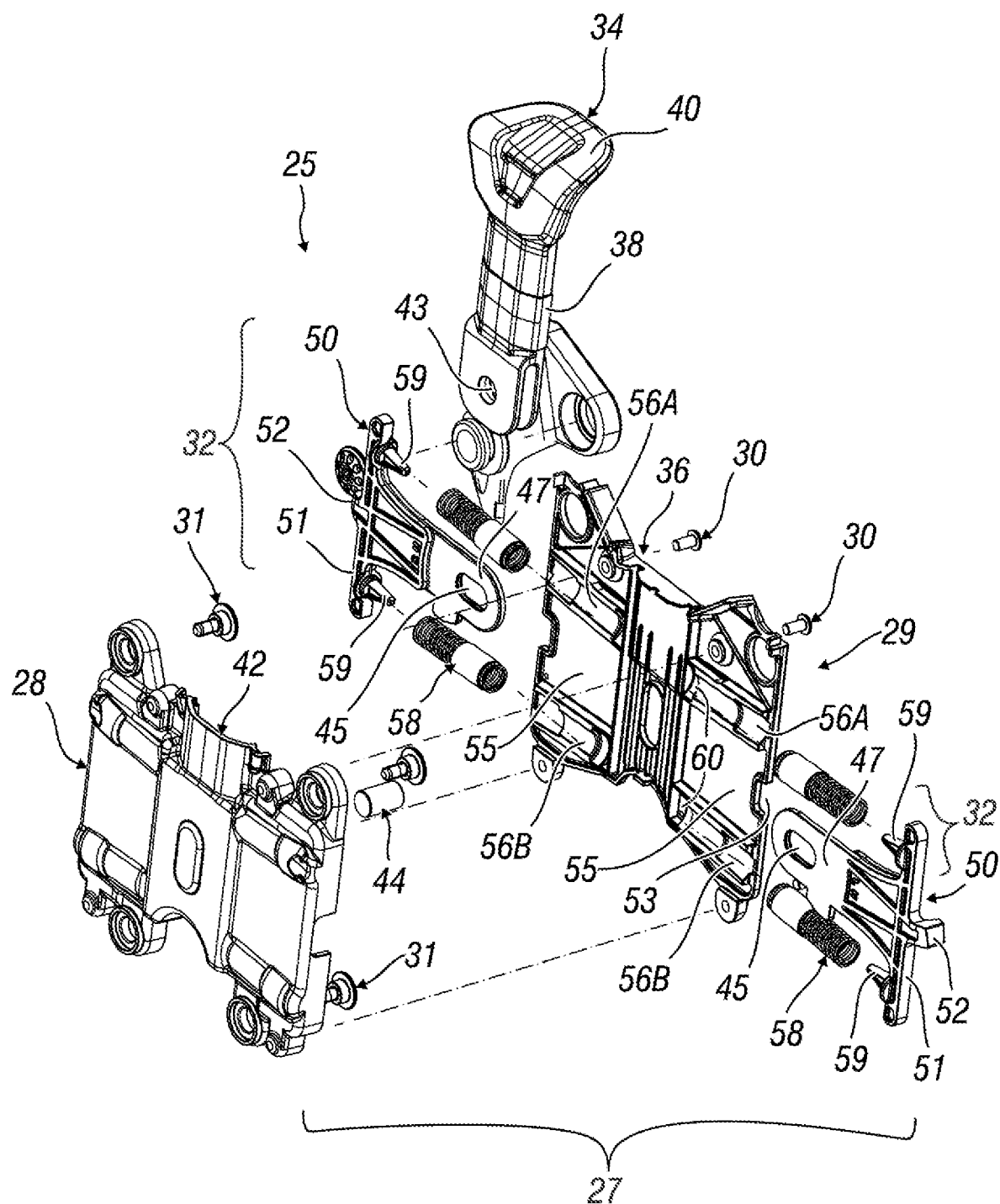
FIG. 7 shows an enlarged view of a detail of the invention.

More particularly, said means comprise a device for unlocking/locking of the windscreen 25 (shown enlarged in FIG. 7), which device is integral with the connection body 6 and is slidably associated with a seat 26 provided in the face 13 of the fixed support portion 7.

The unlocking/locking device 25 comprises a box-shaped body 27 with two shells 28 and 29 which are connected to one another by means of screws 30, one of these shells 28 being secured on the inner side 12 of the body 6 by means of screws 31.

In the box-shaped body 27 there are present (and protected against dust and mud) movable elements 32 for unlocking/locking of the movement of the transparent portion of the windscreen 1; these movable unlocking/locking elements 32 are placed laterally on a control element 34 which projects from the box-shaped body 27 having a straight portion 38 which is inserted in said body, and a gripping part 40 on the exterior thereof. The control element 34 projects from an upper side 36 of the box-shaped body with reference to the position of the part 2 of the vehicle which is placed below the windscreen 1. In the present text, "upper" and its derivatives indicates "further from the part 2", whereas "lower" indicate "closer to the part 2". The same applies to "top" and "bottom" and their derivatives or equivalent terms.

Figure 4:
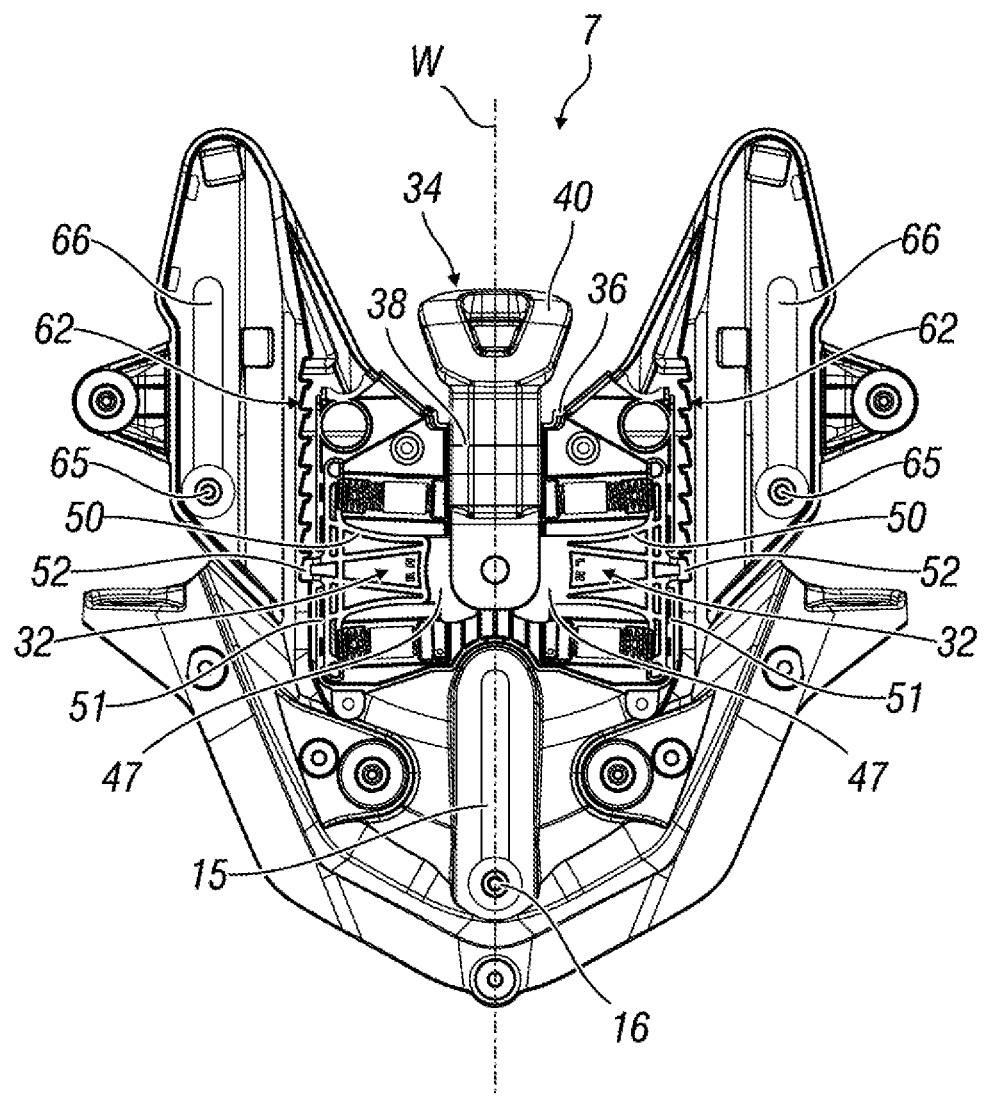
FIGS. 4-6 show a view of part of the windscreen in FIG. 1 in various stages of the operation of adjustment of the height of the windscreen itself.

The control element 34 can be displaced axially manually in the box-shaped body 27 inside a seat 42 thereof, and this element 34 has a through-hole 43 in the straight portion 38 in which there is inserted a pin 44 which connects this control element to the movable elements 32, said pin also being inserted inside a slit 45 (which at least at rest is placed orthogonally to the element 34), provided in a first portion 47 of each movable element 32, and inside the seat 42 where the control element moves (along the axis W of the straight portion 38 thereof, see FIG. 4). The portions 47 of said movable elements are superimposed on one another on one side of the straight portion 38 of the control element 34.

The portion 47 of each movable element 32 is integral with a second end portion or part 50 thereof which has a yielding resilient structure and ends laterally in a side 51 from which a tooth 52 projects. This tooth projects from a lateral opening 53 of the box-shaped body 27. The end part 50 with the yielding resilient structure is placed in a corresponding seat or recess 55 provided inside the box-shaped body, between opposite upper 56A and lower 56B seats for resilient elements 58, which can be inserted on pins 59 of the corresponding side 51 on the one hand, and on the other hand can be supported on a respective stop 60 provided in the box-shaped body 27. These resilient elements 58 are compression springs.

The teeth 52 projecting from the movable elements can cooperate with corresponding racks (or successions of seats or adjacent and consecutive recesses) 62 provided on the opposite sides of the seat 26 of the box-shaped body 27, which seat is provided in the fixed support portion 7. The unlockable/lockable cooperation between said projecting teeth 52 and the racks 62 makes it possible to position the transparent portion 5 stably at different heights relative to the front part 2.

Finally, it should be noted that the connection body 6 which is associated with the transparent portion 5 is rendered integral with the support portion 7 by means of pins 65 which slide in slits 66 of this portion 7; the connection between the body 6 and the portion 7 thus makes it possible to guide the movement of the transparent portion of the windscreen 1 when it is displaced upwards or downwards relative to the front part 2 of the motorcycle 1.

This displacement always takes place along the aforementioned axis W.

Figure 5:
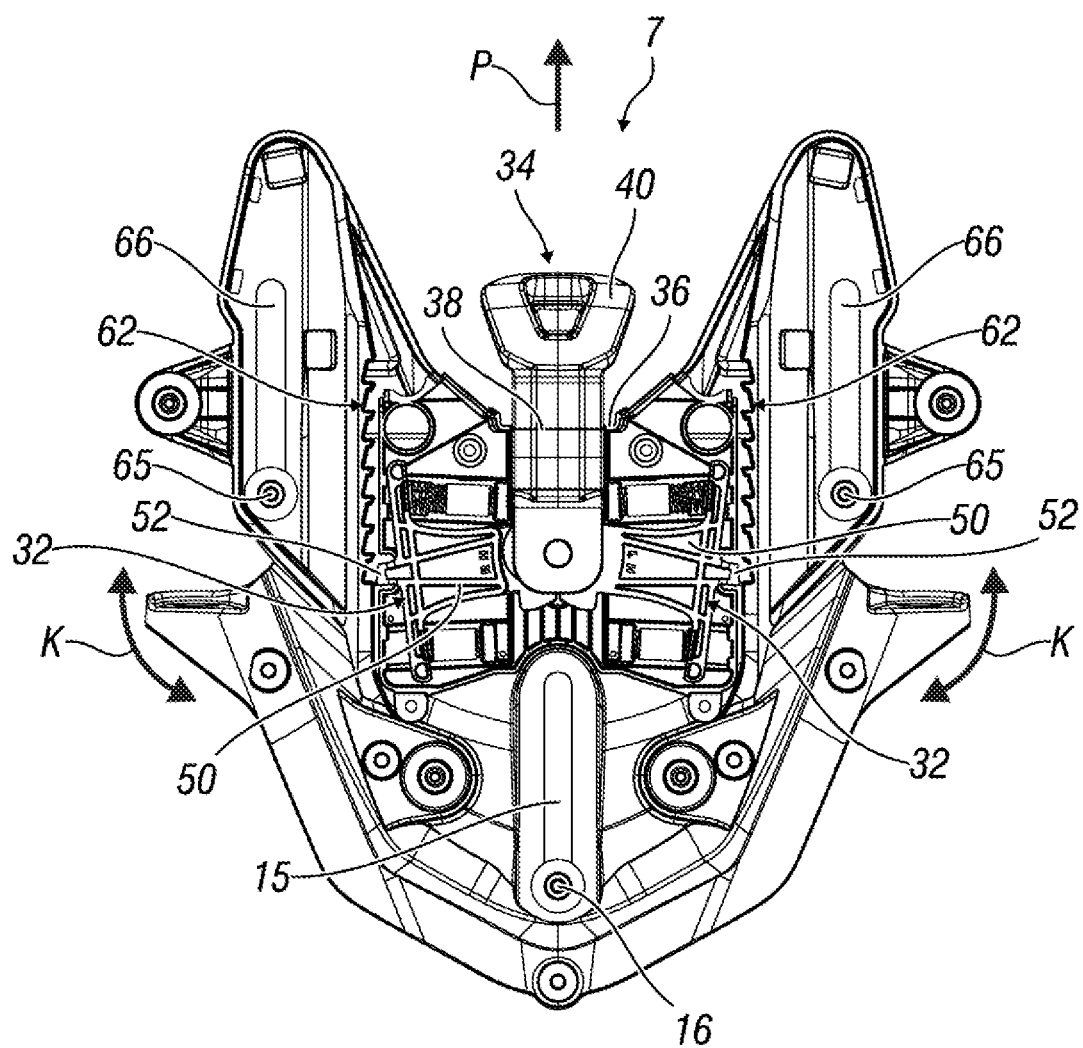

It is now assumed that the windscreen is in the completely lowered position on the support portion 7 (and thus on the front part 2 of the vehicle), as shown in FIG. 4. In order to raise the windscreen, the pilot grasps the gripping part 40 of the control element 34, and displaces it (arrow P in FIG. 5) along the axis W upwards (with reference to the part 2 below). By means of this movement, each portion 47 of the movable elements 32 is drawn upwards by the control element 34 and the end part 50 of these elements 32, is forced into the respective recess 55, and rotates around the upper part thereof with its lower part (arrow K in FIG. 5), with the consequence that the corresponding tooth 52 protrudes from the relevant rack 62. This is in opposition to the resilient elements 58 which are present in the lower seats 56B.

Figure 6:
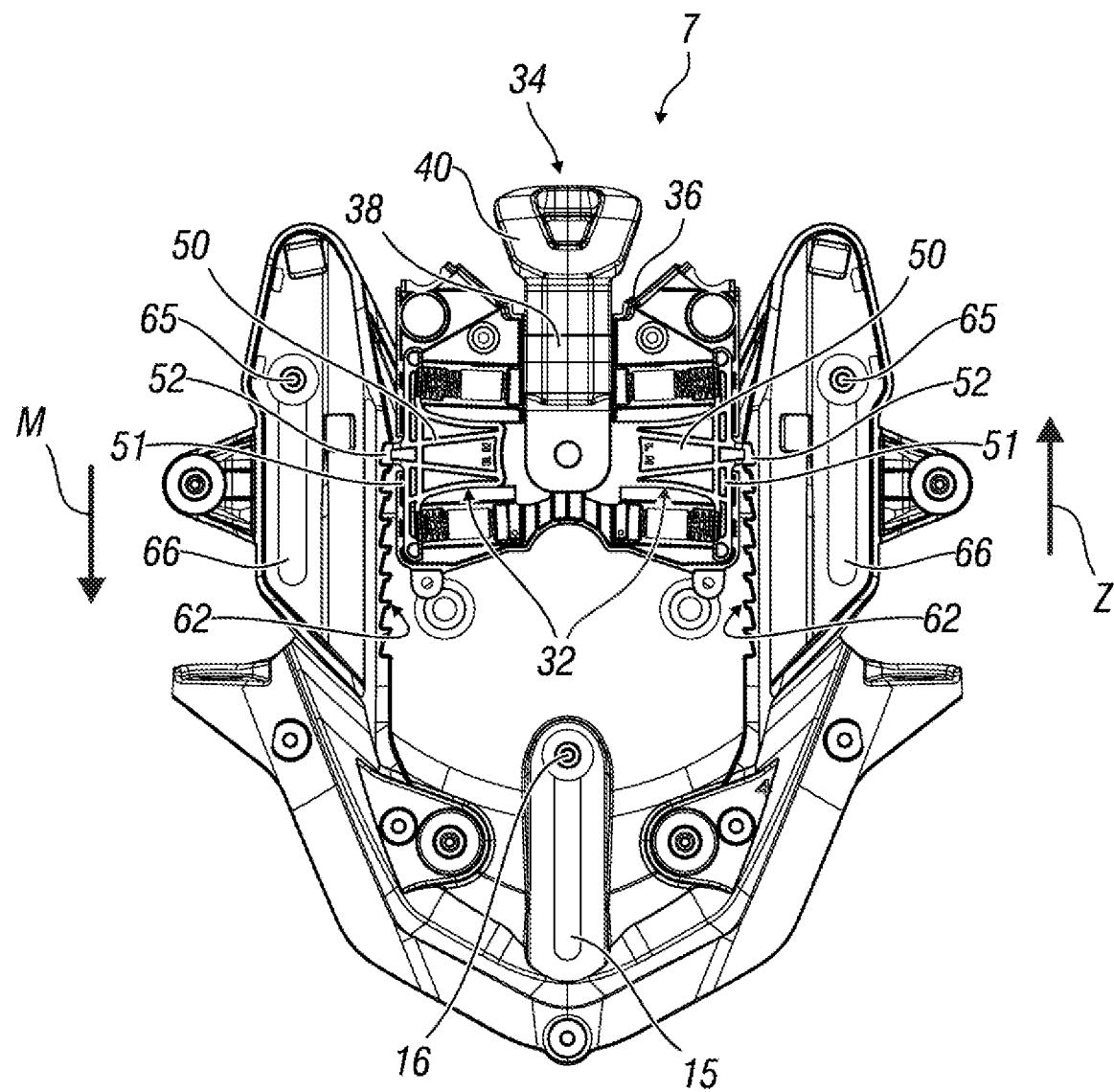

The unlocking/locking device is thus unlocked from the fixed support portion 7, and the box-shaped body 27 can slide upwards (arrows Z in FIG. 6), drawn by the control element 34, into the corresponding seat 26, with the consequent movement of the connection body 6 and the transparent portion 5, along the support portion 7, in a manner guided by the slits 66.

When the position of this portion 5 which the driver requires is reached, the gripping part 50 is released, and the action of the resilient (lower) elements 58 as well as the resilience of each end part 50 of the movable elements 32 takes the corresponding tooth 52 into a different recess of the corresponding rack 62.

The height of the windscreen relative to the movable part has thus been modified by means of raising of the windscreen.

In order to lower the windscreen, the procedure is the same, but with pressing of the gripping part towards the box-shaped body 27, thus rotating each movable element 32 such as to be supported on the lower part of the respective recess 55, in opposition to the upper resilient elements 58 (the ones which are placed in the upper seats 55A of the body 27).

This gives rise to the consequent detachment of each tooth (in opposition to the action of said resilient elements 58) from the respective rack. Pushing the control element 34 downwards (arrow M in FIG. 6) lowers the transparent portion as far as the required position; when the control element 34 is released, the resilient elements 58 of the seats 56A, which were originally compressed, take the end parts 50 of the movable elements into the position of rest once more, and the corresponding teeth 52 are locked in respective seats of the racks in the position reached.

The figures also show other components of the windscreen, such as the deflectors 80 or various elements for securing of the parts of the windscreen. These components are in themselves known and/or their use is obvious, and therefore they will not be described.

The windscreen produced according to the invention is easy to use for the driver, who can raise or lower simply the transparent portion 5 of the windscreen (or more simply "raise or lower" the windscreen) by using a single control element, and without getting off the vehicle. This is highly ergonomic, since the operation can be carried out with a single hand. The movement of the windscreen can be obtained by exerting a limited force to move the control element, and without further actions other than that on the control element itself.

A preferred embodiment of the invention has been described. Others are however possible: for example, the movable means for unlocking/locking can be produced in a manner other than that described, for example by means of rigid units which are preferably resiliently loaded and integral with the control element 34; these units can rotate around a pin, such as a hook, secured on the box-shaped body 27, when subjected to an action of traction of said control unit. Or, they can return inside the box-shaped body 27 if withdrawn by this control element when displaced along the axis W. These variants must also be considered as being included in the scope of the following claims.

The invention claimed is:

1. A windscreen with an adjustable height for a motorcycle, which windscreen is adapted and configured to be associated with a front part of the motorcycle, said windscreen comprising:
  a support portion which is secured on this front part,
  a transparent portion which is movable relative to the support portion, and
  movement means for allowing the height of this transparent portion to be varied relative to the support portion, the movement means comprising a body which is integral with the transparent portion and is movable in a guided manner along the support portion, this movable body comprising movable unlocking/locking elements which protrude from said movable body and are subjected to resilient thrust elements,
  said unlocking/locking elements being connected to a control element which is movable in said movable body if activated manually, said unlocking/locking elements cooperating with consecutive and adjacent seats or recesses placed along the support portion in which said movable body is adapted and configured to be displaced,
  the manual activation of said control element moving said unlocking/locking elements relative to the movable body to separate them from the corresponding seats of the support portion, and making possible to move the movable body and thus the transparent portion relative to the support portion,
  the release of said control element making said unlocking/locking elements cooperate with other seats, to lock said transparent portion in different positions relative to said support portion,
  wherein the support portion comprises a seat in which there moves in a guided manner the movable body which is integral with the transparent portion, the unlocking/locking elements protruding laterally from said movable body and cooperating with the consecutive and adjacent seats or recesses placed at the sides of said seat of the support portion,
  said movable body being a box-shaped body with two shells which are connected to one another, the unlocking/locking elements being inserted in said box-shaped body, and having lateral projections which are movable relative to a corresponding opening provided laterally in said box-shaped body.

2. The windscreen according to claim 1, wherein there are two unlocking/locking elements, which are inserted in corresponding seats of the box-shaped body, said movable unlocking/locking elements each comprising a first portion which is adapted and configured to cooperate with the control element, and a second, yielding and resilient portion which supports said lateral projection.

3. The windscreen according to claim 2, wherein said seats are interposed between seats for the resilient thrust elements, these elements lying between an end part of the corresponding unlocking/locking elements and fixed stops of the box-shaped body.

4. The windscreen according to claim 2, wherein said resilient thrust elements are compression springs, and are fitted onto pins of the end parts of the unlocking/locking elements.

5. The windscreen according to claim 2, wherein each unlocking/locking element comprises an elongate hole in the first portion, which hole lies orthogonally to the control unit; this unit having a hole in a straight portion thereof which is inside the box-shaped body and is adapted and configured to receive a pin which also passes into the elongate holes of the unlocking/locking elements, and connects these elements to said control unit, a gripping part being provided on said control unit and projecting from said box-shaped body.

6. The windscreen according to claim 1, wherein the consecutive seats or recesses form a rack on the sides of the seat in which the body which is integral with the transparent portion is movable.

7. The windscreen according to claim 1, wherein said movable body is integral with a connection body which is secured directly on the transparent portion, said connection body being movable in a guided manner relative to the support portion.

8. The windscreen according to claim 7, wherein said connection body has a hollow projection which slides in a guide slot of the support portion, said hollow projection being retained in said slot by a connection unit having a widened head which is supported on, and slides inside a recess provided in the vicinity of the guide slot inside the support portion, with further securing pins which are inserted in slits of said support portion and are connected to said connection body, together with the aforementioned projection and the guide slot, guiding the movement of the connection body on said support portion.

* * * * *